United States Patent [19]
Tamura

[11] Patent Number: 6,003,994
[45] Date of Patent: Dec. 21, 1999

[54] MICROFILM SEARCH METHOD AND DEVICE

[75] Inventor: Hiroshi Tamura, Tokyo, Japan

[73] Assignee: Fuji Photo Film Co., Ltd., Kanagawa, Japan

[21] Appl. No.: 09/160,353

[22] Filed: Sep. 25, 1998

[30] Foreign Application Priority Data

| Sep. 25, 1997 | [JP] | Japan | 9-276632 |
| Sep. 25, 1997 | [JP] | Japan | 9-276633 |
| Sep. 25, 1997 | [JP] | Japan | 9-276634 |

[51] Int. Cl.$^6$ ........................................ G03B 21/14
[52] U.S. Cl. ................................. 353/26 A; 353/25
[58] Field of Search ........................ 353/25, 26 R, 353/27 R, 26 A, 27 A, DIG. 2, 121

[56] References Cited

U.S. PATENT DOCUMENTS

| 3,885,866 | 5/1975 | Stearns | 353/26 |
| 4,825,065 | 4/1989 | Imai | 353/26 A |
| 4,864,149 | 9/1989 | Matsumoto | 353/26 A |
| 5,245,199 | 9/1993 | Okitsu | 353/26 A |
| 5,354,994 | 10/1994 | Hicks | 353/26 A |
| 5,416,605 | 5/1995 | Hideshima et al. | 353/26 A |
| 5,590,941 | 1/1997 | Hindeshima | 353/26 A |

Primary Examiner—William C. Dowling
Attorney, Agent, or Firm—Sughrue, Mion, Zinn, Macpeak & Seas, PLLC

[57] ABSTRACT

There is disclosed a microfilm search method and device in which the presence of frames is accurately determined from a density change in a running direction of a microfilm. The detected density change is binarized into white and black synchronously with a sampling signal outputted for each predetermined feeding amount of the microfilm. The number of white signals included in a group of a predetermined number of binarized signals consecutive immediately before each sampling signal is successively obtained in response to the sampling signal. For the negative film, the presense of frames is determined by judging white (out-frame) when the number of white signals equals/exceeds a set value and by judging black (in-frame) when the number of white signals is less than the set value. The set value for determining the inside or outside of the frame may be changed when going into the frame from the outside of the frame and vice versa. Thereby, detection precision can further be raised.

10 Claims, 12 Drawing Sheets

FIG.12 ically, in the present invention, in response to each
MICROFILM SEARCH METHOD AND DEVICE

BACKGROUND OF THE INVENTION

1. Field of the Invention

The present invention relates to a microfilm search method and device which searches a desired frame by determining the presence of frames from a density change in microfilm running direction.

2. Description of the Related Art

In a known microfilm search method, search marks (blips) are photographed or recorded besides the frames on microfilm and used as reference marks. The blips of microfilm during running are read and counted, and the blip count is used to identify frame addresses when a specific frame is sought. On the other hand, there is proposed a search method in which, instead of using the blips, the presence of frames is detected directly, and a desired frame is searched for from a sequence of detected frames.

Frames may be incorrectly detected, if frame edges are not aligned, or if dust sticks to the microfilm. Moreover, in a case where there is only a small difference in density between the frame on which document or image is photographed and a peripheral portion surrounding the frame, the frame cannot be accurately detected. If the frame is incorrectly detected or cannot be detected in this manner, the desired frame cannot be searched for correctly.

SUMMARY OF THE INVENTION

The present invention has been accomplished under the circumstances above, and a first object thereof is to provide a microfilm search method in which, by detecting the presence of frames, a desired frame can be correctly searched for without frame detection error.

A second object of the present invention is to provide a microfilm search device in which, by detecting the presence of frames without error, a desired frame can be correctly searched for.

The first object of the present invention is attained by the provision of a method for searching a desired frame from a method for searching a desired frame from a microfilm by detecting the presence of frames from a density change in the running direction of the microfilm, comprising the steps of:

a) successively detecting a film density of the microfilm along the running direction of the microfilm to obtain a series of density signals;

b) sampling a density signal from the density signals in synchronization with a sampling signal which is produced for each predetermined feeding amount of the microfilm, and binarizing the sampled density signal into binarized signal which is white or black signal, the white signal representing a film transparent portion and the black signal representing a film non-transparent portion;

c) successively obtaining the number of white or black signals included in a group of a predetermined number of the binarized signals consecutive immediately before each sampling signal in response to the sampling signal;

d) determining in-frame or out-frame when the number of the white or black signals in each group equals or exceeds a set value, while determining out-frame or in-frame when the number of the white or black signals is less than the set value;

e) discriminating one frame from a film position which is determined as in-frame to a film position which is successively determined as out-frame; and f) searching for the desired frame from a sequence of the discriminated frame.

Specifically, in the present invention, in response to each sampling signal, the number of white (film transparent portion) or black (film non-transparent portion) signals included in the group of the predetermined number of binarized signals immediately before the sampling signal is obtained, and white or black is determined depending on whether or not the number of white or black signals equals/exceeds the set value. For example, when the microfilm is a negative film, a background in the frame on which image or document is photographed becomes black (opaque) while a peripheral portion surrounding the frame becomes white (transparent). Therefore, at a time the determination result changes from white to black, it can be determined that the frame starts at this time or immediately before this time. For example, by obtaining a ratio W/N of the number W of white signals relative to the total number N of binarized signals included in the group, at a time the ratio W/N equals/exceeds a constant set value, it is determined to be white (i.e., out-frame) at this time or immediately before this time.

In a case where the microfilm is a positive film, in-frame (i.e., inside of the frame) is white (transparent) while out-frame (i.e., the outside of the frame) is black (non-transparent). Therefore, when the determination result changes from black to white, it is determined that the detected or sensed position on the film enters into the inside of the frame. On the other hand, when the result changes from white to black, the end of the frame is determined.

Here, by detecting density changes of the microfilm in a plurality of positions in width direction of the microfilm, a plurality of determination results obtained from the density changes in the plurality of positions can be used to determine the presence of frames. In this case, when photographing system of the microfilm changes to Simplex, Duo, Duplex, or the like, by using the density changes of positions corresponding to the photographing system, the change of the photographing system can be dealt with. Moreover, the presence of frames may be judged by majority decision of a plurality of determination results or otherwise.

The set value for determining white (out-frame) or black (in-frame) may be varied when going into a frame and when going out of the frame. When the microfilm is a negative film, in the former case (when entering the frame), the ratio W/N of the number W of white signals relative to the number N of total binarized signals of the group is reduced. Contrarily, in the latter case (when going out of the frame), the ratio W/N is increased. Specifically, in the former case, the probability of determining in-frame (black) in an interspace between frames (white) is lowered, while in the latter case, the probability of determining out-frame (white) inside the frame (black) is lowered. Thereby, frame detection precision is further raised, and frame detection error is reduced.

According to the present invention, the second object is attained by the provision of a device for searching a desired frame from a microfilm by detecting the presence of frames from a density change in the running direction of the microfilm, comprising:

a) an encoder for outputting a sampling signal for each predetermined feeding amount of the microfilm;

b) a density sensor for successively detecting the film density of the microfilm along the running direction of the microfilm to output a series of density signals, the density sensor being provided within a frame travel width of the microfilm;

c) a binarizing section for sampling a density signal from the density signals in synchronization with said sampling signal, and for binarizing the sampled density signal into a binarized signal which is white or black signal, the white signal representing a film transparent portion and the black signal representing a film non-transparent portion;

d) a determination section for successively obtaining the number of white or black signals included in a group of a predetermined number of the binarized signals consecutive immediately before each sampling signal in response to the sampling signal, to determine in-frame or out-frame when the number of white or black signals equals or exceeds a set value and to determine out-frame or in-frame when the number of the white or black signals is less than the set value, and for descriminating one frame from a film position which is determined as in-frame to a film position which is successively determined as out-frame to output a determination signal indicative of the presence of the frame; and e) a searching section for searching for the desired frame based on said determination signal.

Here, plural density sensors may be provided in the width direction of the microfilm, and the determination section may determine the presence of frames by selecting and using only the density signals corresponding to the photographing system, or when majority or more than a constant ratio of plural determination results indicate that there is a frame.

The density sensor can be constituted by arranging end faces of a pair of optical fibers opposite to each other between which the microfilm is held. By introducing light from one optical fiber to the other optical fiber, the light quantity incident on the other optical fiber is measured by a photosensor. With such construction, a large number of density sensors can be arranged close to one another in the width direction of a narrow microfilm.

DETAILED DESCRIPTION OF THE PREFERRED EMBODIMENT PRINCIPLE OF THE INVENTION

Figure 7:
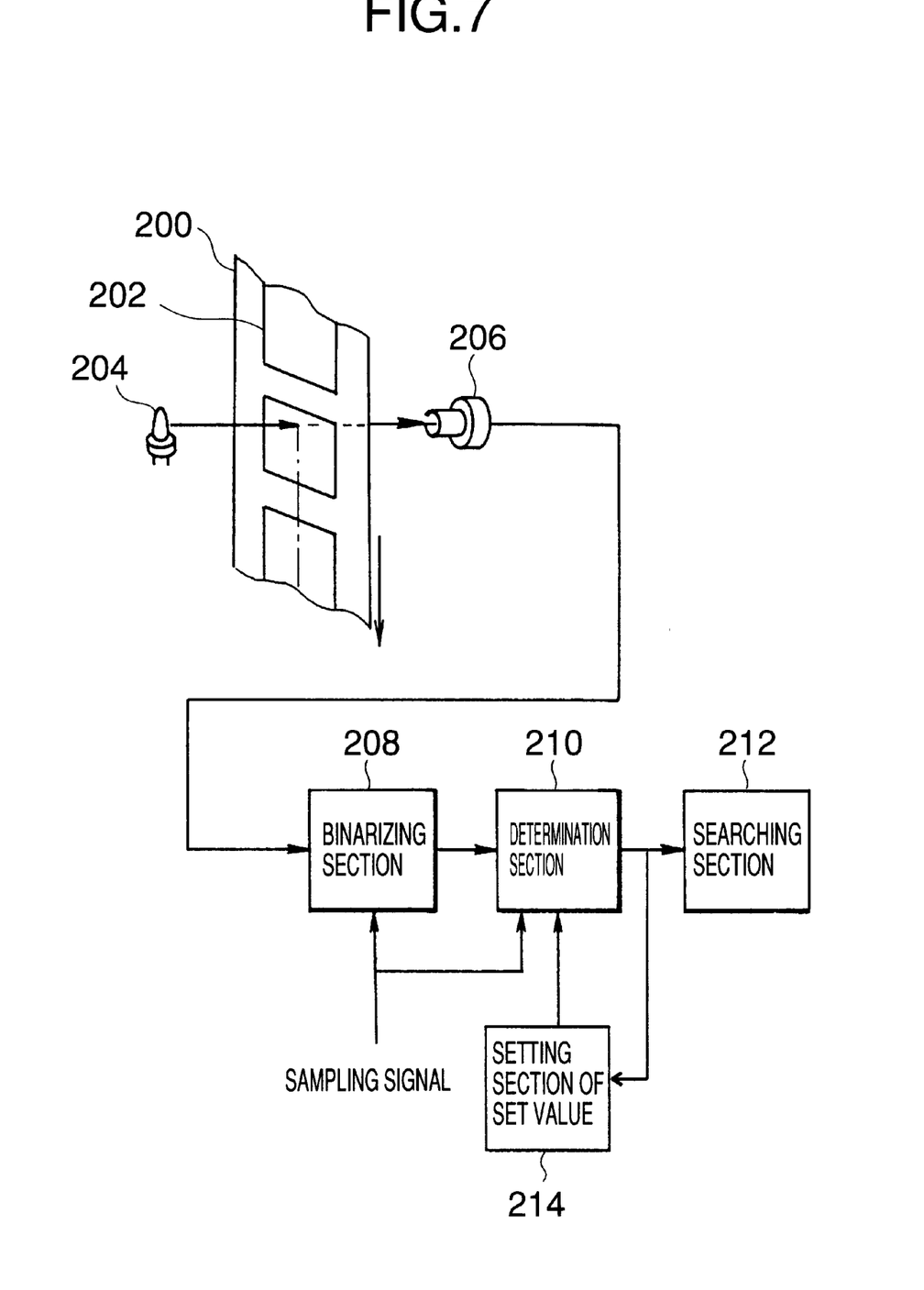
FIG. 7 is a diagram explaining the outline of the present invention.
Figure 8:
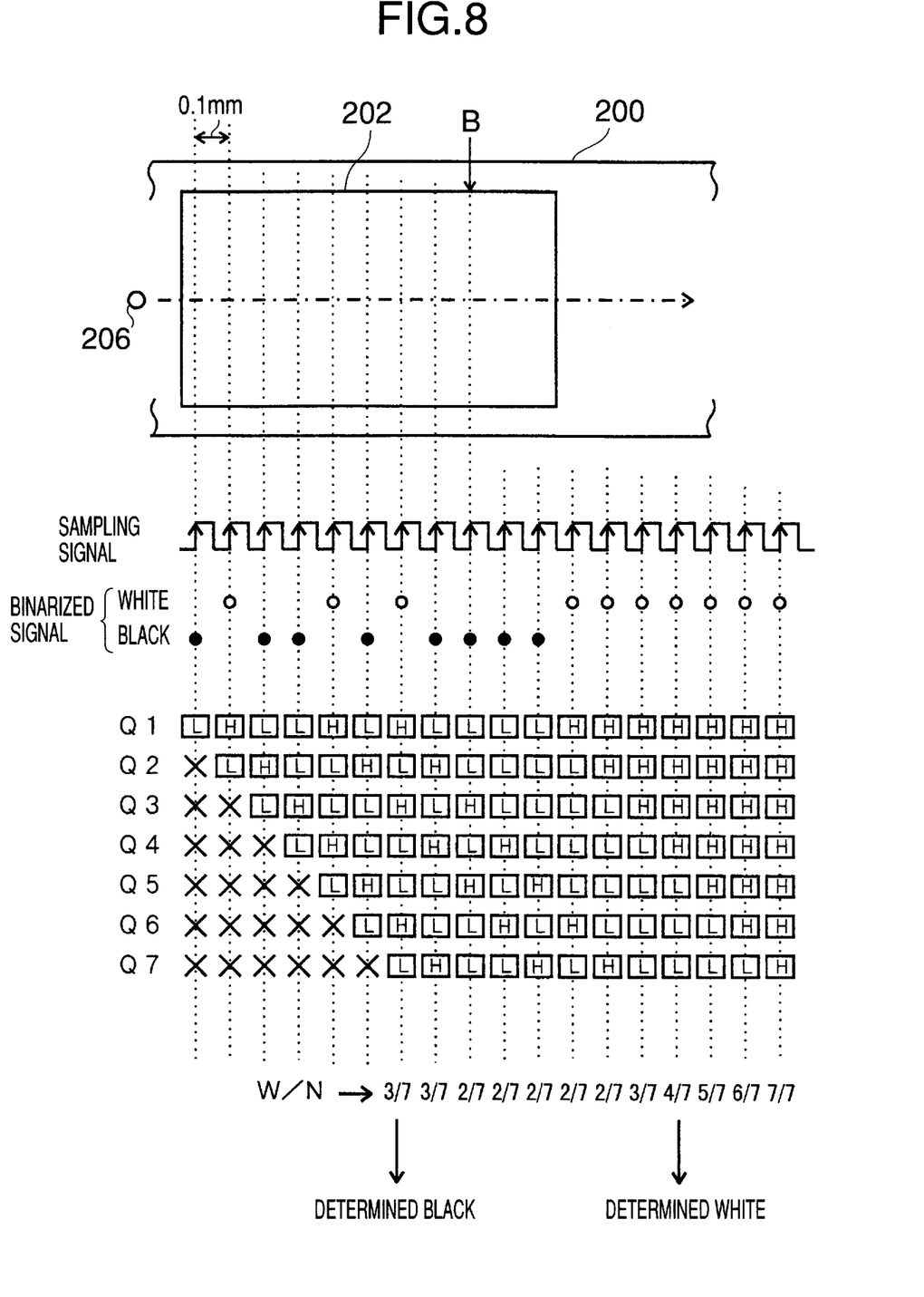
FIG. 8 is a diagram showing function of a determination section.
Figure 9:
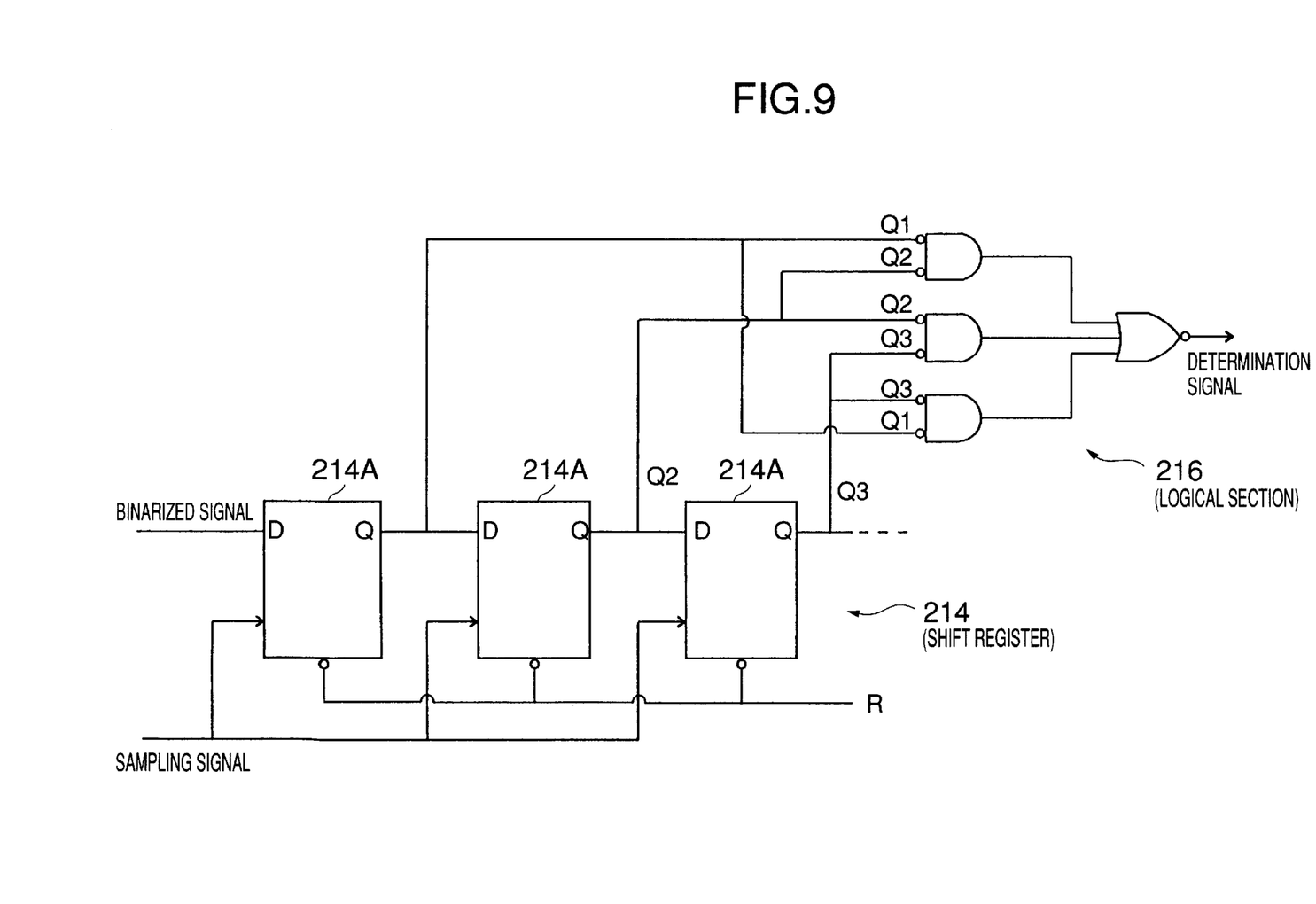
FIG. 9 is a diagram showing an example of a circuit in the determination section.

FIG. 7 is a diagram explaining the outline of the present invention; FIG. 8 is a diagram showing the function of a determination section, FIG. 9 is a diagram showing an example of a circuit in the determination section; and FIGS. 10 and 11 are diagrams schematically showing operation of the determination section. The basic principle of the present invention will first be described using these figures.

In FIG. 7, a reference numeral 200 denotes a roll of microfilm, and frames 202 are arranged and photographed on the microfilm 200 in a longitudinal direction. Numerals 204 and 206 denote a lamp and a photosensor which are opposed to each other with the microfilm 200 held therebetween. Thus, the lamp 204 and the photosensor 206 constitute a density sensor for detecting a film density of the microfilm 200. When feeding the microfilm 200, the density sensor can detect a density change in running direction of the microfilm 200. A density signal outputted from the photosensor 206 is binarized to H level and L level by a predetermined threshold value in a binarizing section 208 as shown in FIG. 8. H level corresponds to a film transparent portion (white), while L level corresponds to an opaque portion (black). The binarizing processing is performed in synchronization with a sampling signal outputted from an encoder. The encoder detects the feeding amount of the microfilm 200 and outputs the sampling signal every time a constant feeding amount (e.g., 0.1 mm) is reached. The sampling signal functions as a clock signal to instruct a sampling timing for sampling and simultaneously binarizing the densitiy signal, and also serves as a clock signal for defining a determination timing in a determination section described later.

Additionally, in a case where the microfilm is a negative film, H level (white) corresponds to out-frame or inter-frame, while L level (black) corresponds to in-frame. In the present specification, the microfilm will be described below as the negative film as far as not described otherwise.

The binarized density signals are fed into a determination section 210. The determination section 210 successively receives the binarized signals and counts, at every time when sampling signals are emitted, the number W of white signals included in a group of a predetermined number N of contiguous binarized signals entered before the corresponding sampling time. If the number of white signals equals/exceeds a set value, it is determined that the density sensor is positioned outside the frame. That is, sampling position which is just sensed by the density sensor is determined as white or out-frame at this sampling time. If the number of white signals is less than the set value, it is determined that the density sensor is positioned inside the frame. The position just detected by the density sensor is determined as black or in-frame at this sampling time. Thereby, the beginning and end of each frames is discriminated, so that the presence of frames can be determined. The set value for determination of white (out-frame) or black (in-frame) may be set in ratio W/N. Determination results or signals of the determination section 210 are supplied into a searching section 212, in which the number of detected frames is counted, a desired frame is searched by referring to the frame count, and the desired frame is transmitted to an image projecting position to stop the feeding of the microfilm 200.

As aforementioned, since white (out-frame) or black (in-frame) is determined using a predetermined number of sampled contiguous binarized signals, there is less possibility of incorrectly judging that frames are finished at a point where a character or an image appears white inside of the frame (black). Also, even in a case where dust or stain is photographed as black at the outside of the frame (white), a possibility of incorrectly judging that a frame is started is reduced.

The determination section 210 determines or detects the presence of frames using the predetermined number of contiguous binarized signals. For example, in FIG. 8, determination of the frame is performed using seven contiguous binarized signals Q1 to Q7. The binarized signal inputted in response to each sampling signal is successively transmitted to a seven-digit shift register. When the seventh sampling signal is emitted, the previous seven binarized signals Q1 to Q7 are regarded as one group. The group is successively obtained in response to each sampling signal, and the number of white signals included in each group is obtained. Alternatively, the ratio W/N is also obtained.

The determination section 210 determines that the vicinity of the sampling position is black (i.e., inside the frame) when the number of white signals is less than a set number (e.g., four) and that the vicinity is white (i.e., outside the frame) when the number equals/exceeds the set number. In FIG. 8, black (in-frame) is determined at a ratio W/N<4/7, while white (out-frame) is determined at a ratio W/N≧4/7.

For the determination of black/white, N-signals are used, which include from the binarized signal, which is obtained from the previous sampling position returned only by a predetermined number N back from the current sampling position at the time of determination, to the binarized signal in the current sampling position at the time of determination. Therefore, strictly to say, the film position at the time of sampling returned by the number N back from the position at the time of determination can be used as a position where black/white is determined However, in the present invention, by correctly discriminating the presence of frames on the microfilm, the desired frame is searched for from the sequence of the frames. Therefore, the beginning or the end of the frame does not need to be detected with high accuracy.

FIG. 8 diagrammatically shows the principle of the determination process, and the frame 202 is indeed remarkably larger than an interval 0.1 mm between sampling positions. For the actual frames, the film density is detected and the binarized signal is produced with a smaller sampling interval. When judging from the position of the first binarized signal of the group for use in determination, in FIG. 8, a point to be judged as the end of the frame (W/N≧4/7) is considered to be a point B which is returned only by N from a point which is determined white. It is true that the point B is positioned before a terminal end of the frame 202. However, in actual operation, since the interval between sampling signals or position is remarkably smaller than the size of the frame 202, there is only a small difference between the point B and the actual end position of the frame 202. The difference does not exceed 0.1×7=0.7 mm in the example. Therefore, even if the point B is determined to be the end position of the frame, little influence is exerted on the frame search. Moreover, the sampling point at the time of determination as white, which is shown at the bottom of FIG. 8, is positioned behind the actual terminal end of the frame, but its difference from the actual end position is also small. Consequently, the film position to be determined black/white may be either the sampling position at the time of determination or the sampling position returned only by the predetermined number N.

The determination section 210 having the aforementioned function can be constituted as shown in FIG. 9. In details, the determination section 210 is constituted of a shift register 214 and a logical section 216. To simplify the following explanations, a three-digit shift register is shown in FIG. 9. The shift register 214 has a predetermined number of digits of D flip-flops 214A (delay flip-flops, hereinafter referred to as D-FF). Each D-FF 214A feeds a binarized signal to the next D-FF in sequence in synchronization with the sampling signals. The binarized signals Q1, Q2 and Q3 emitted from the D-FF 214A are transmitted to the logical section 216. Symbol R is a reset signal for resetting each D-FF 214A.

Figure 10A:
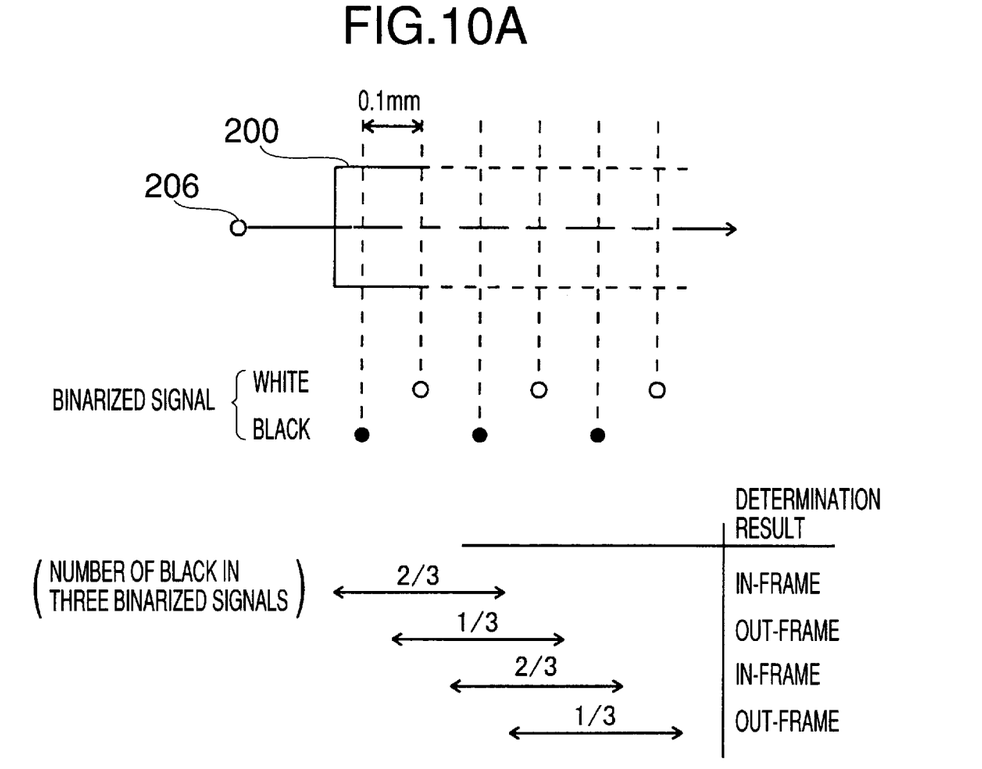
FIGS. 10A and 10B are diagrams showing examples of operation of the determination section when three contiguous binarized signals are used to determine whether the density sensor is positioned inside or outside a frame.
Figure 10B:
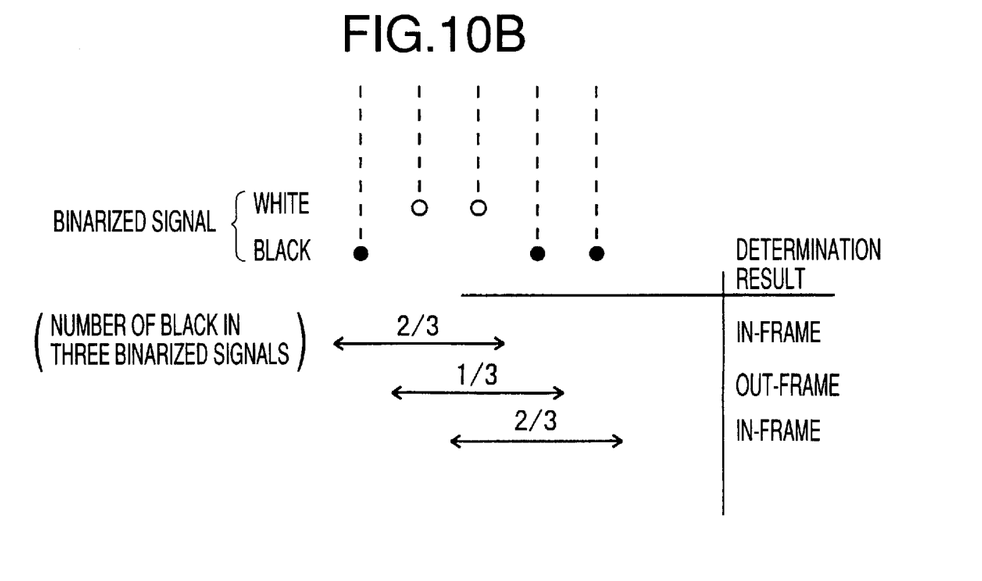

The logical section 216 is constituted of a combination of NOR circuits, and herein outputs a determination signal indicative of in-frame if two or more of three consecutive binarized signals Q1 to Q3 are black. FIG. 10 is a diagram showing determination results obtained by using the logical section 216 of FIG. 9. FIG. 10A and FIG. 10B are different from each other in black/white arrangement of the binarized signals.

Figure 11A:
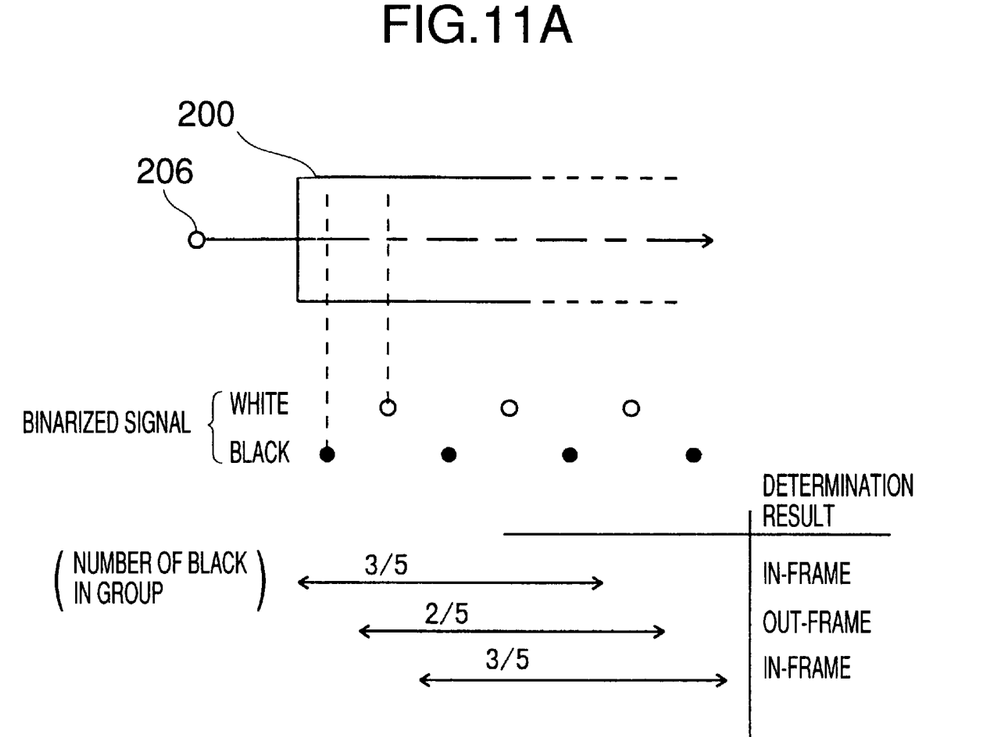
FIGS. 11A and 11B are diagrams showing examples of operation of the determination section when five consecutive binarized signals are used to determine whether the density sensor is positioned inside or outside a frame.
Figure 11B:
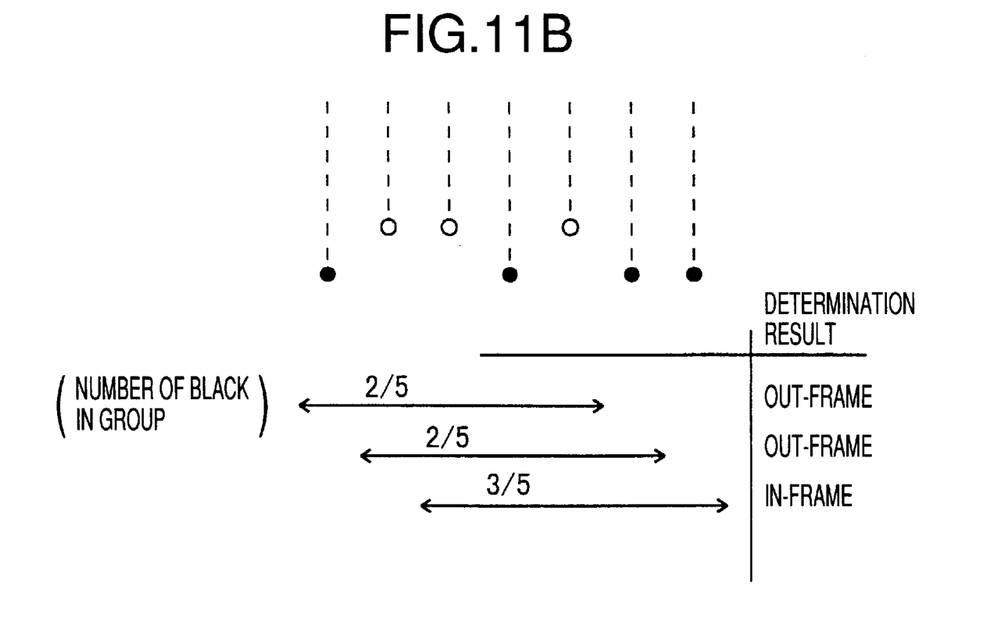

FIG. 11 shows determination results in a case where five binarized signals are included in one group, and in-frame condition is determined if three or more of the five binarized signals are black. FIG. 11A and FIG. 11B are different from each other in black/white arrangement of the binarized signals.

Referring again to FIG. 7, numeral 214 denotes a setting section of a set value (threshold value) for determination of white and black. The setting section 214 separately sets set values S1 and S2. The set value S1 is set when the density sensor or photosensor 206 goes from an interspace between frames into a frame. The set value S2 is set when the photosensor 206 goes from the inside of the frame to the outside of the frame. The selected set value S1 or S2 is transmitted to the determination section 210. Specifically, when the determination signal emitted from the determination section 210 is white (inter-frame), for example, W/N= 2/7 is set and selected as the set value S1 for determination of black (in-frame). When the determination signal is generated as black (in-frame), for example, W/N=5/7 is set as the set value S2 for determination of white (out-frame).

Figure 12:
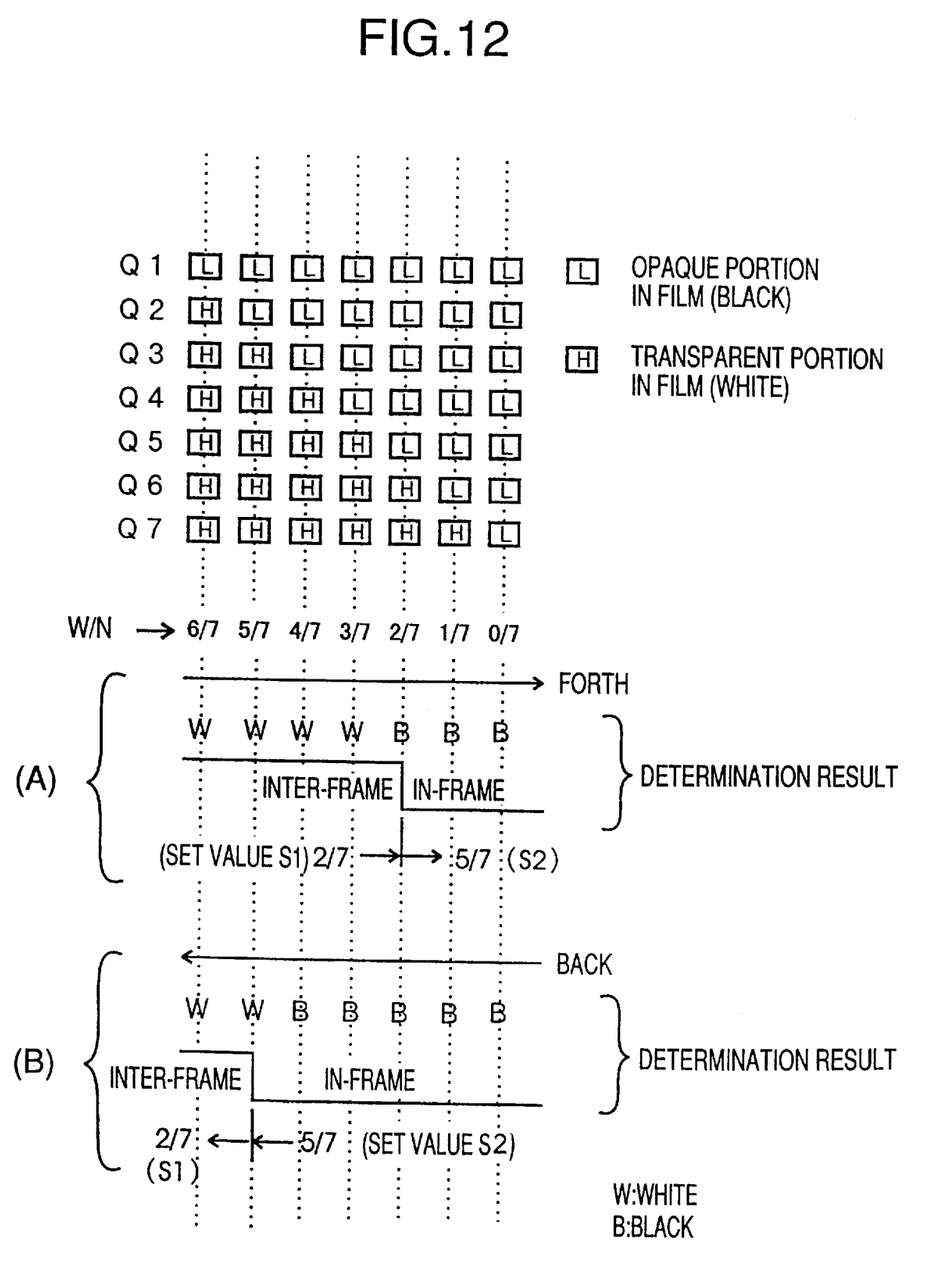
FIG. 12 is a diagram showing examples of operation in the determination section, in which a set value S1 for determining the entrance of the density sensor into the frame is set different from a set value S2 for determining the departure of the density sensor from the frame, the part (A) showing changes of the set value from S1 to S2 and determination results when the film is fed forward (forth), and the part (B) showing changes of the set value from S2 to S1 determination results when the film is returned (back).

The part (A) of FIG. 12 shows changes of the set value and determination results when the film is fed forward (forth). Similarly, the part (B) of FIG. 12 shows changes of the set value and determination results when the film is returned (back). The determination section 210 determines white/black using the set value S1 when the photosensor 206 is positioned between the frames of the microfilm, i.e., in the transparent portion (parting portion). When the photosensor 206 is inside the frame, i.e., in the opaque portion, the determination of white/black is performed using the set value S2. Here, the set value S1 is smaller than the set value S2.

By varying the set values S1 and S2 as aforementioned, once in-frame is determined, a probability of determining inter-frame (parting portion) is reduced. Contrarily, once inter-frame is determined, a probability of determining in-frame is lowered, thereby enhancing determination precision for determining the presence of the frames. Specifically, once inside the frame (black), even if there is a slight amount of dirt, a photographed character, or the like which appears white in the frame (black), a possibility of erroneously judging that the frames are finished is reduced. Moreover, once out-frame (white) is judged, even if there is a slight amount of dirt or dust which appears black outside the frame (white), a possibility of incorrectly judging that a new frame is started is reduced.

In the above description, the microfilm is regarded as the negative film. In a case where the microfilm is a positive film, the inside of the frame (specifically, background inside the frame) is non-transparent (black), and the outside of the frame is transparent (white). Therefore, in a case where the set value is defined by the ratio W/N in the same manner as in the negative film, the set value S1 while the photosensor 206 goes from an interspace between frames into a frame may be set larger than the set value S2 while the photosensor 206 goes out of the frame to the interspace.

EMBODIMENT

A preferred embodiment will be described in more detail hereinafter with reference to the drawings.

Figure 1:
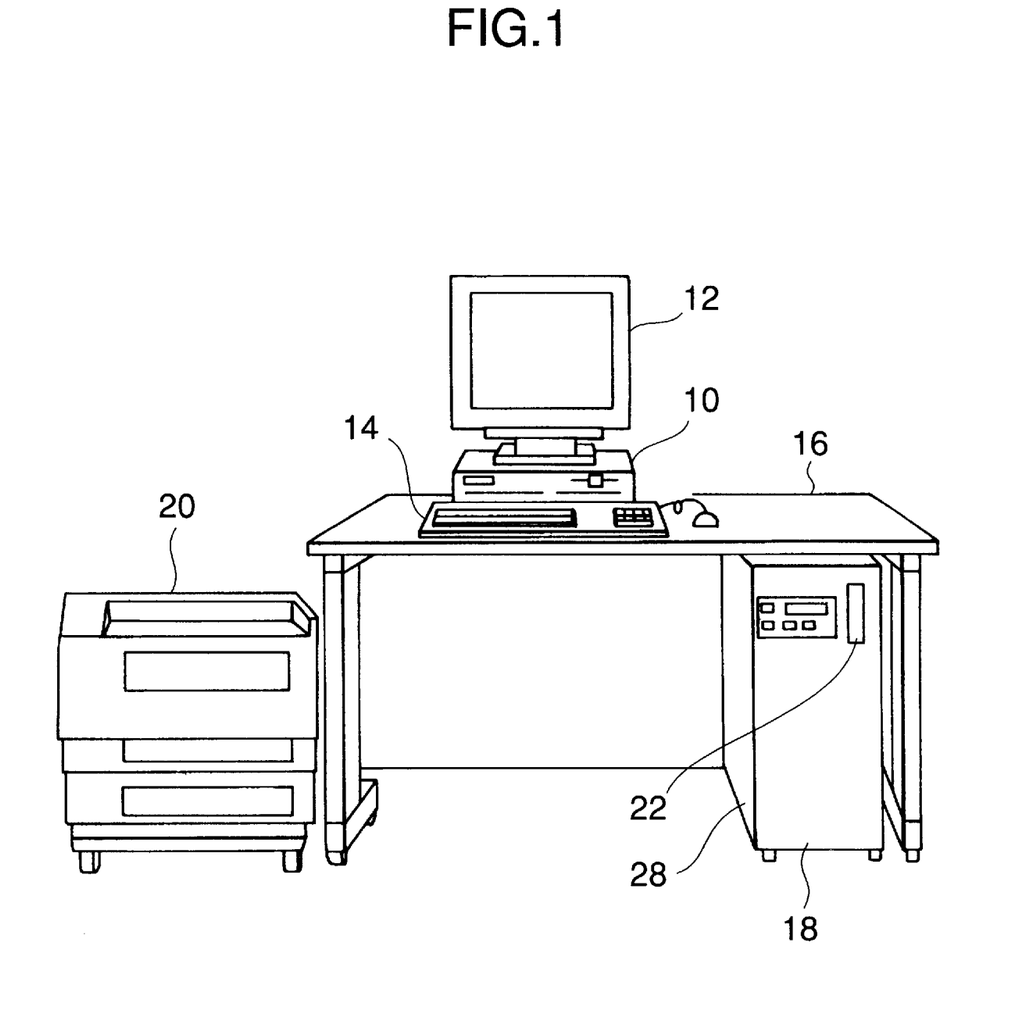
FIG. 1 is a diagram showing an image reading and processing apparatus which incorporates a microfilm search device of an embodiment according to the present invention.
Figure 2:
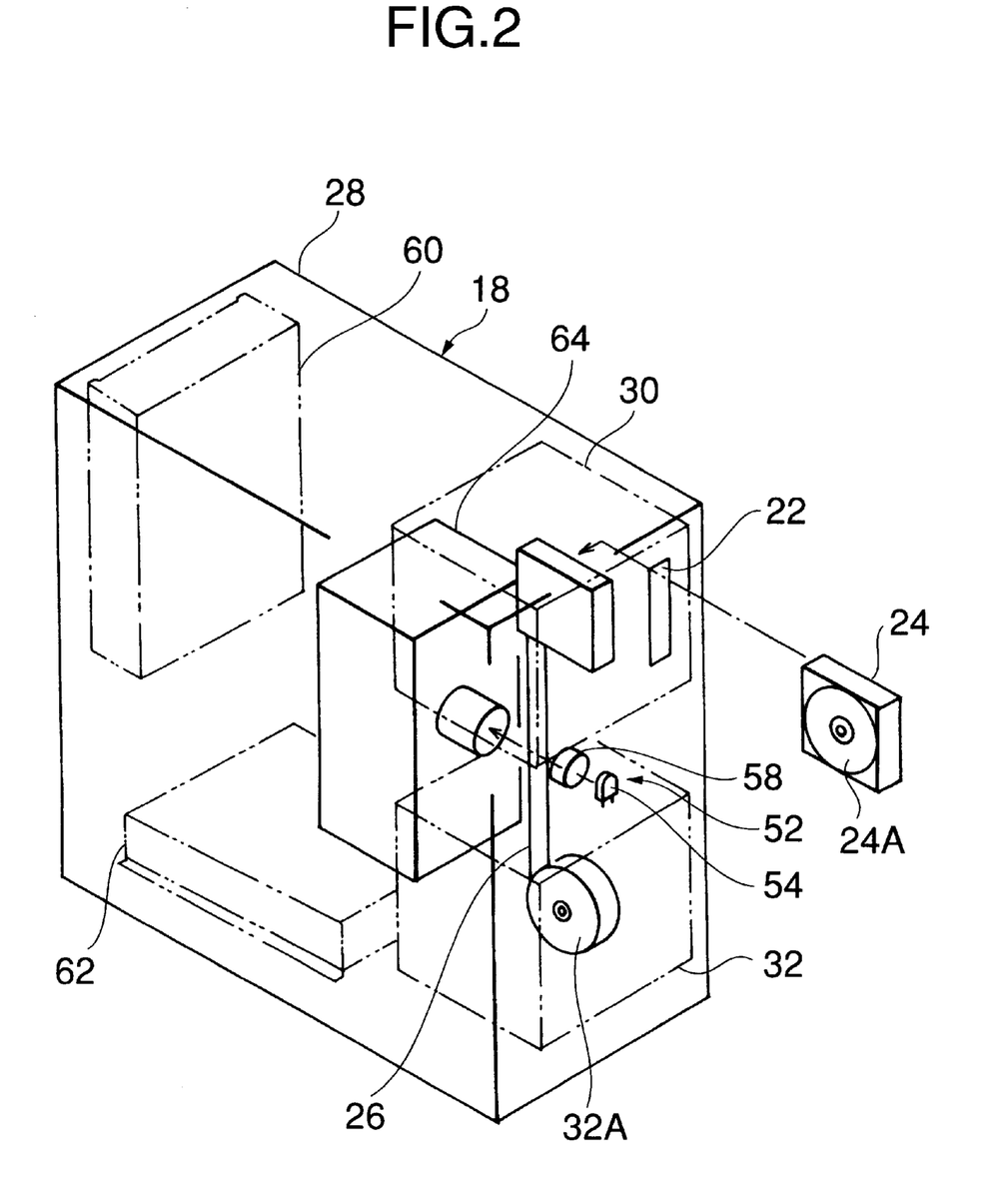
FIG. 2 is a perspective view illustrating the interior of a scanner used in the embodiment of FIG. 1.
Figure 3:
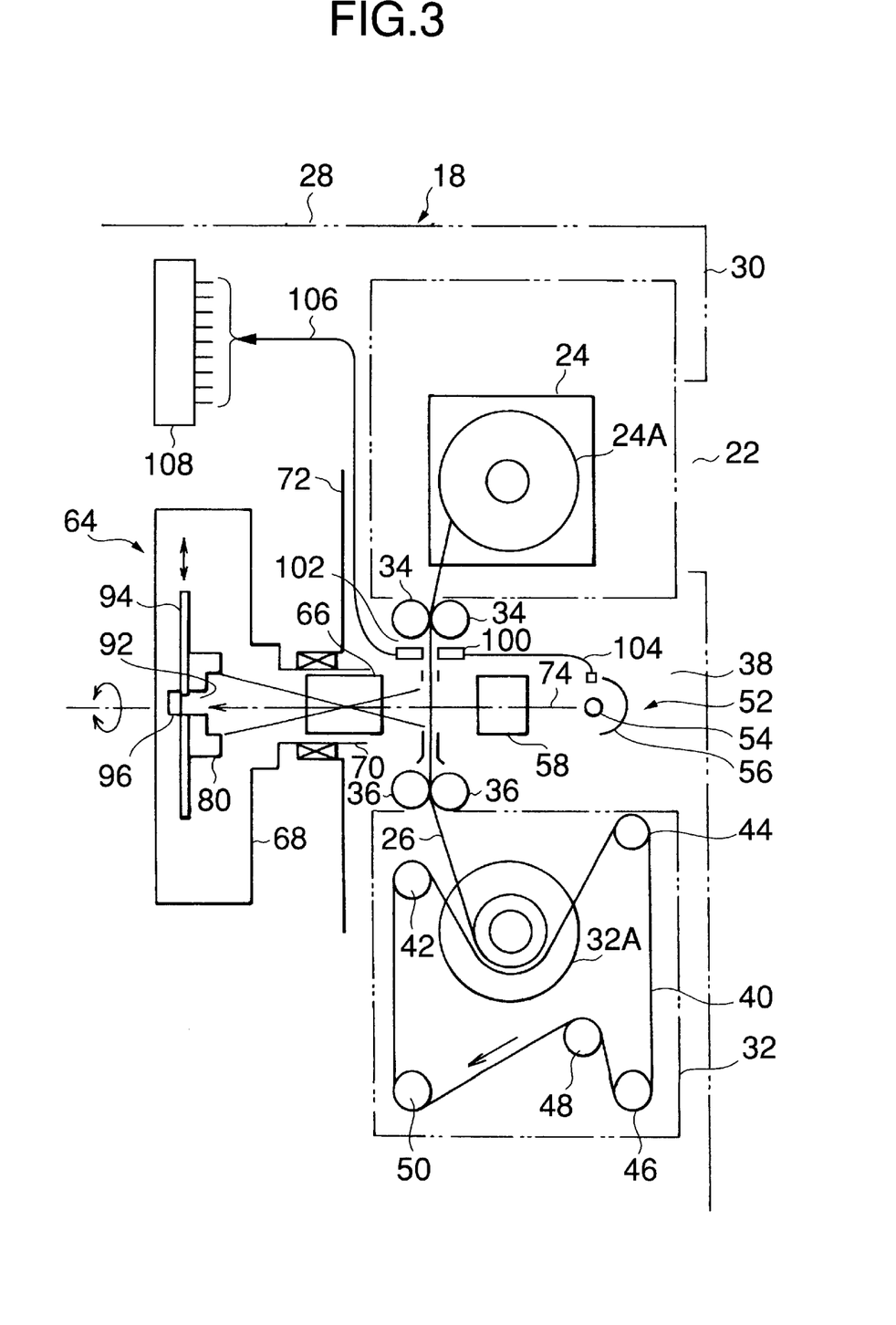
FIG. 3 is a side view illustrating an arrangement of main parts of the scanner shown in FIGS. 1 and 2.
Figure 4:
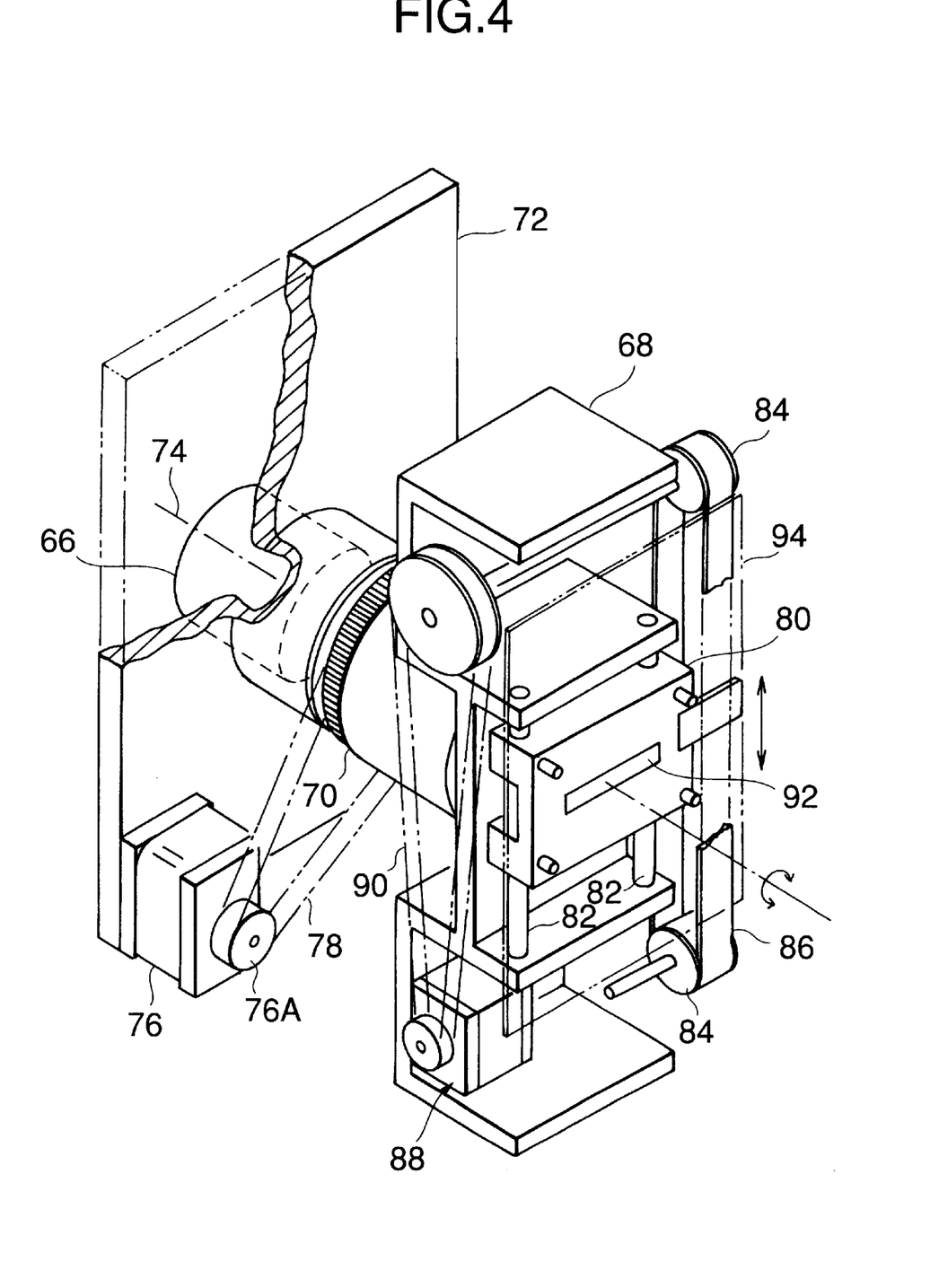
FIG. 4 is a perspective view illustrating a line sensor unit in the scanner in FIG. 3.
Figure 5:
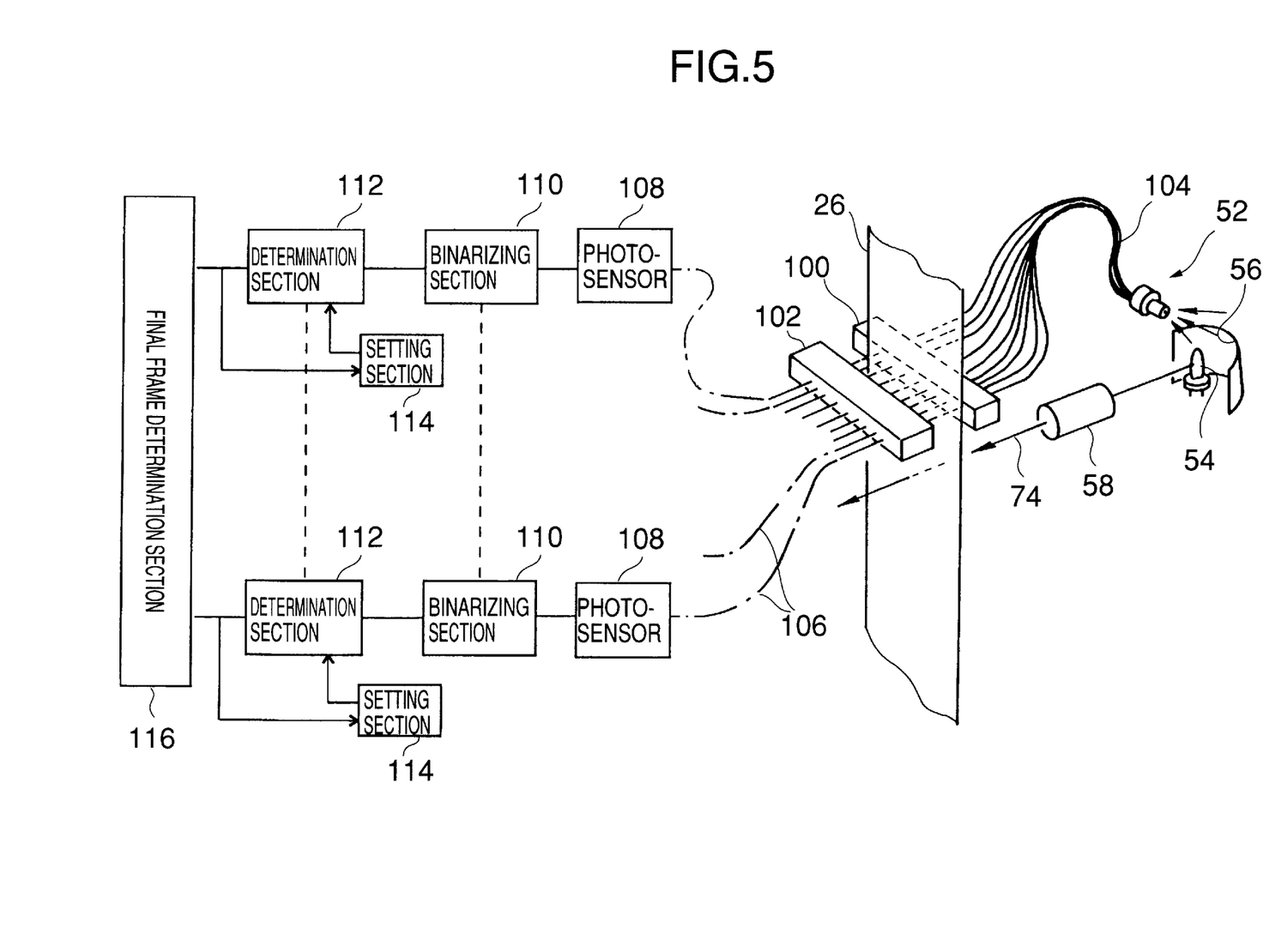
FIG. 5 is a diagram showing an arrangement of the main parts of the microfilm search device of the embodiment and explaining a flow of operation accoding to the present invention.

FIG. 1 is a diagram showing an image reading and processing apparatus which incorporates a microfilm search device according to an embodiment of the present invention; FIG. 2 is a perspective view illustrating the interior of a scanner for use herein; FIG. 3 is a side view illustrating an arrangement of main parts of the scanner; FIG. 4 is a perspective view illustrating a line sensor unit in the scanner; FIG. 5 is a diagram showing an arrangement of main parts of a device for detecting frames; and FIG. 6 is an explanatory view of an arrangement of optical fibers.

In FIG. 1, a reference numeral 10 denotes a computer body containing a CPU or other processing means. Display means 12 such as a CRT or a liquid crystal panel and a keyboard 14 are placed on a desk 16. A scanner 18 is stored under the desk 16 and incorporates therein a microfilm search device according to the present invention. Numeral 20 denotes a printer placed beside the desk 16.

The scanner 18 has a cartridge insertion port 22 formed in the upper portion of its front panel. The scanner 18 reads, at a low resolution, an image on a roll of microfilm 26 with a width of 16 mm held in a cartridge 24 (refer to FIGS. 2 and 3) which is loaded through the insertion port 22. The CPU in the computer body 10 performs a predetermined image processing of the read image, and the resultant image is displayed on the display means 12.

The reading or scanning operation of the image is carried out while the roll film 26 moves without moving a line sensor 96, which will be described hereinafter in detail. During the operation, the CRT display device 12 sequentially changes and displays the read image synchronously with the travel of the film 26. Therefore, the displayed image moved in the display surface of the CRT 12 is in synchronization with the travel of the film 26, so that the displayed image may be substantially the same as that which is projected on a screen.

For a manual search, an operator monitors the image on the display means 12 and instructs a print output of a required image on the display means 12. In response to this output instruction, the scanner 18 sets a corresponding frame in the correct position, and reads the entire image on the frame at a high resolution. The high density image is printed by the printer 20, and either stored in an optical magnetic disk, a hard disk or the like, or transferred to an external storage device.

For an automatic search, the address of a desired frame is input through the keyboard 14. In the automatic search, as aforementioned, the frames on the microfilm 26 are detected, and the number of the frames is counted to search for a desired frame. The frame search is performed by the searching section 212 using the determination results of the determination section 210 indicating the presence of frames.

The structure of the scanner 18 will now be described. The scanner 18 has a vertically longitudinal casing 28, in which there are arranged a feed reel driving unit 30 in the upper potion of the front side and a take-up reel driving unit 32 at the lower portion of the front side. When the cartridge 24 is inserted into the cartridge insertion port 22, the cartridge 24 is moved automatically so that a reel 24A held in the cartridge 24 engages with a rotating shaft of the feed reel driving unit 30. And then, the feed reel driving unit 30 pulls out the leader portion of the roll film 26 from the cartridge 24 and feeds it downward to guide it to a take-up reel 32A in the take-up reel driving unit 32.

When viewing the scanner 18 in FIGS. 2 and 3, the film 26 passes through the rear side of the open space between the reel driving units 30, 32, that is, the film 26 passes through at the inner back side viewed from the front of the casing 28. Referring to FIG. 3, there are shown guide rollers 34, 34, 36 and 36 for guiding the film 26. Accordingly, a space 38 is defined by the open area between the reel driving unit 30, 32 and a front panel 28A of the casing 28, and a light source 52, which will be described later, is housed in this space 38.

The take-up reel driving unit 32 has a drive belt 40 which travels while contacting the reel 32A as shown in FIG. 3. The drive belt 40 is wound on guide rollers 42 and 44, a drive roller 46, an encoder 48 and a tension roller 50, and it is driven by the drive roller 46 in a film take-up direction (indicated by an arrow in FIG. 3). The encoder 48 outputs a sampling signal every time a constant feeding amount of the film 26 (e.g., 0.1 mm) is reached.

The light source 52 is housed in the space 38 between the above-described reel driving units 30 and 32, and includes a lamp 54, a reflection mirror 56, a condenser lens 58, and an appropriate filter. In FIG. 2, a power supply circuit 60 and a power control circuit 62 for controlling an actuator such as a motor are illustrated.

A line sensor unit 64 will now be described. The line sensor unit 64 is integrated with a projection lens 66. More specifically, as shown in FIGS. 3 and 4, a cylindrical portion 70 for holding the projection lens 66 is integrally formed with a frame (rotatable frame) 68 of the line sensor unit 64. The projection lens 66 mounted in the cylindrical portion 70 is a fixed focus lens with a magnifying power of approximately two. The cylindrical portion 70 is rotatably supported by a frame (fixed frame) 72, which is secured to the casing 28, so that the inclination of an image to be read can be corrected. The cylindrical portion 70 rotates about a light axis 74 perpendicular to the surface of the film 26.

A belt 78 is wound around the cylindrical portion 70 of the rotary frame 68 and a pulley 76A of a servo motor 76 mounted on the fixed frame 72. As the servo motor 76 rotates, the rotary frame 68 rotates around the light axis 74.

On the rotary frame 68, a movable plate 80 is provided on the side opposite to the cylindrical portion 70 as shown in FIG. 4. The movable plate 80 is slidably mounted on a pair of guide rods 82, 82 to permit the movable plate 80 to reciprocate in the vicinity of an opening of the cylindrical portion 70 in a direction perpendicular to the light axis 74.

In the rotary frame 68, a belt 86 wound on pulleys 84, 84 extends in a direction parallel to the up-and-down moving direction of the movable plate 80, and one side of the movable plate 80 is fixed to the belt 86. The rotation of a servo motor 88 is transmitted via a belt 90 to one of the pulleys 84. With this structure, when the servo motor 88 rotates forward and in reverse, the movable plate 80 reciprocates across a plane perpendicular to the light axis 74.

On the movable plate 80, an elongated window (narrow slit) 92 is formed in a direction perpendicular to the guide rods 82, 82, i.e., in a direction perpendicular to the up-and-down moving direction of the movable plate 80. The window 92 has its longitudinal center that corresponds with the light axis 74. A printed circuit board 94 is fixed to the rear face of the movable plate 80, i.e., the face opposite to that facing the cylindrical portion 70, so as to be perpendicular to the light axis 74.

A longitudinal CCD arrayed line sensor 96 is fixed to the board 94 to face the window 92 (FIG. 3). In addition, a preamplifier for amplifying the output of the line sensor 96 is mounted on the board 94. The positioning of the light reception face of the CCD line sensor 96 must correspond to a plane on which an image projected from the projection lens 66 is focused.

A frame detecting device will next be described with reference to FIG. 5. In a position in front of the position where an image on the microfilm 26 is read, i.e., on the upstream side of the light axis 74 (the side of the feed reel 24A), a pair of optical fiber holding blocks 100, 102 are provided in such a manner that they extend across the film 26 along the width direction and they are opposed to both faces of the film 26 with slight gaps. Optical fibers 104, 106, nine each being arranged in the film width direction, are inserted through the blocks 100, 102, respectively.

The optical fibers 104, 106 are held in the blocks 100,102, so that the optical axes of the fibers 104, 106 are perpendicular to the film 26, and end faces of the fibers 104, 106 are opposed to each other with the film 26 placed therebetween. Specifically, the end faces of nine optical fibers 104 are opposed to the end faces of nine optical fibers 106, respectively. As a result, there are nine sets of the opposed end faces with the film 26 placed therebetween.

Nine optical fibers 104 held in the block 100 are bunched and guided toward the vicinity of the lamp 54 of the light source 52. Light beams are radiated from the lamp 54 to the nine optical fibers 104, and guided to one surface (surface on the side of the block 100) of the film 26.

The light beams emitted from the nine optical fibers 104 passes through the film 26 and enters into the opposed optical fibers 106 held in the block 102. The nine optical fibers 106 are guided from the block 102 to the nine photosensors 108, respectively. Density signals outputted from the nine photosensors 108 are separately transmitted to binarizing sections 110, sampled in synchronization with a sampling signal outputted from the encoder 48, and binarized with a predetermined threshold value. The threshold value is set in accordance with a difference in density between a frame and an outer periphery of the frame.

Nine binarized signals are transmitted to determination sections 112, respectively, in which determination results indicative of the presence of frames are obtained based on the output of each photosensor 108. Set values S1 and S2 for use in the determination are set by setting sections 114. Nine determination results are transmitted into a final frame determination section 116, in which the presence of frames is finally determined. The final frame determination section 116 determines whether or not there is a frame from these nine determination results taking account of a photographing system such as Simplex, Duplex, Duo, and the like.

Figure 6A:
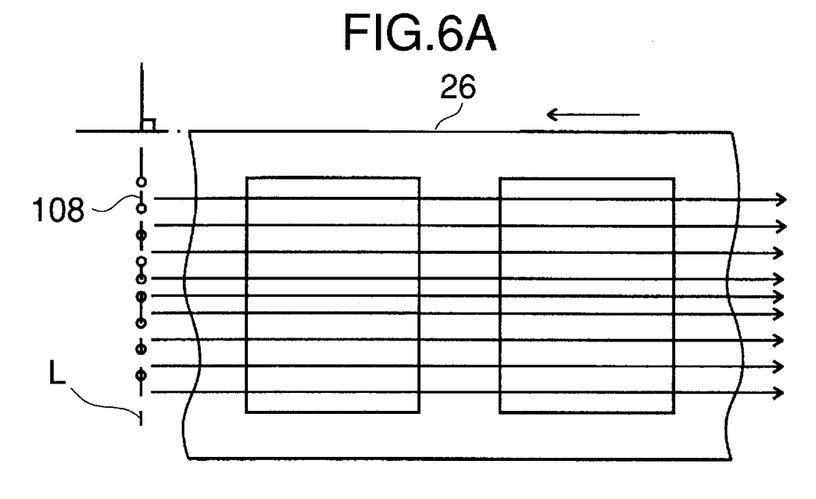
FIGS. 6A, 6B, and 6C are explanatory views of arrangements of optical fibers which serve as density sensors on a microfilm, and show tracking loci of the density sensors relative to microfilms recorded in Simplex, Duplex and Duo systems, respectively.

The end faces of the optical fibers 104, 106 are, as shown in FIG. 6A, positioned on a straight line L perpendicular to the running direction of the film 26 and in different positions along the width direction of the film 26. In the embodiment, since the photosensor 108 detects the quantity of incident light of the optical fiber 106, the photosensor 108 is substantially positioned in a position where the end face of the optical fiber 106 is opposed to the film 26. Therefore, FIG. 6A represents that the photosensors 108 are positioned in end face positions of the optical fibers 106 on the side of the film 26.

The nine photosensors 108 are positioned along the film width direction in such a manner that a plurality of photosensors 108 constantly pass through one frame even if the film photographing system differs. FIG. 6A shows a case where frames of a microfilm photographed in Simplex system are detected. In this case, all the photosensors 108 detect frames. Therefore, the final frame determination section 116 determines the presence of frames using the binarized signals outputted from all the binarizing sections 110. For example, when more than half or more than a constant ratio of determination results obtained by each determination section 112 represent black, it is judged that there is a frame.

Figure 6B:
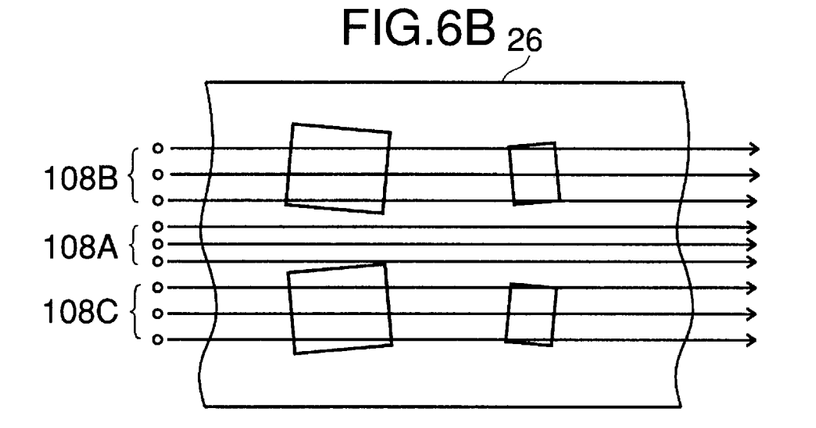

FIG. 6B shows a case of Duplex system. Since a front face and a backside face of an original document are simultaneously photographed on upper and lower channels of the film, photosensors 108A disposed between the channels do not detect frames. In this case, the final frame determination section 116 detects frames in each channel using determination results outputted from three photosensors 108B and three photosensors 108C extending in widths of the upper and lower channels, respectively, except determination results outputted from the photosensors 108A.

Figure 6C:
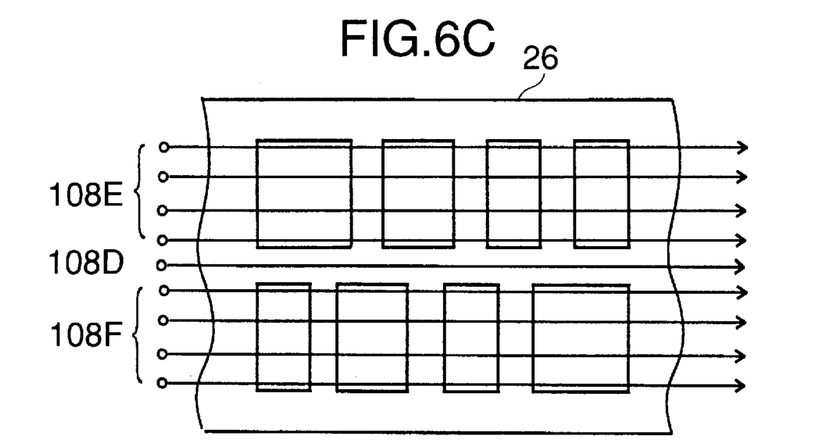

FIG. 6C shows a case of Duo system, and a center photosensor 108D does not detect frames. Therefore, the final frame determination section 116 detects frames in each channel with four photosensors 108E and four photosensors 108F included in two upper and lower groups, respectively. A desired frame is searched for by totaling determination signals outputted by the final frame determination section 116.

In the embodiment described above, since light is guided to each optical fiber 104 using the light source 52 for image reading, a light-source structure can advantageously be simplified. In the present invention, however, another light source may be used. Alternatively, light may be guided to each optical fiber 104 using a plurality of light sources.

In the embodiment, since the optical fibers 104 and 106 are used as aforementioned, the film density can be detected at plural positions arranged adjacent to one another in the width direction of the narrow film 26. However, in the present invention, density sensors sufficiently small to be arranged adjacent to one another can be used. For example, a photo transistor array or a photo diode array in which photo transistors or photo diodes are arranged on the straight line L can be used. Moreover, CCD line sensor may be used.

Furthermore, in the present invention, since the density sensors (photosensors) are arranged on the straight line L perpendicular to the film running direction, the presence of frames can be detected at the same time. Therefore, a deviation in output timing of each density sensor (photosensor) does not need to be corrected like in a case where plural arranged density sensors (photosensors) are deviated from the film running direction. A circuit structure is thus simplified.

As aforementioned, according to the present invention, for the negative film, the density change in the film running direction is sampled and binarized in synchronization with the sampling signal, the number of white signals included in the group of the predetermined number of contiguous binarized signals is successively obtained based on the sampling signal, and the presence of frames is determined by judging white (out-frame) when the number of white signals equals/ exceeds the set value and by judging black (in-frame) when the number of white signals is less than the set value. Therefore, the frame detection precision is raised, and the frame detection error is minimized.

For the negative film, since the set value W/N for determining the begining of the frame is set smaller than the set value W/N for determining the finish end of the frame, the probability of erroneously determining out-frame can be lowered once in-frame is determined, while the probability of incorrectly determining in-frame can be lowered once inter-frame is judged. Therefore, the frame detection precision is further raised, and the frame detection error is further minimized.

After the presence of frames is determined in each of a plurality of positions along the film width direction, the presence of frames can be determined using the determination results. In this case, if the determination results to be used are changed in accordance with the film photographing system, even a film of a different photographing system can be dealt with easily. Additionally, when a plurality of determination results are used, by determining the presence of the frame when more than a constant ratio (e.g., more than half) of the determination results are black, determination precision can further be enhanced.

What is claimed is:

1. A method for searching a desired frame from a microfilm by detecting the presence of frames from a density change in the running direction of the microfilm, comprising the steps of:
    a) successively detecting a film density of the microfilm along the running direction of the microfilm to obtain a series of density signals;
    b) sampling a density signal from the density signals in synchronization with a sampling signal which is produced for each predetermined feeding amount of the microfilm, and binarizing the sampled density signal into binarized signal which is white or black signal, the white signal representing a film transparent portion and the black signal representing a film non-transparent portion;
    c) successively obtaining the number of white or black signals included in a group of a predetermined number of the binarized signals consecutive immediately before each sampling signal in response to the sampling signal;
    d) determining in-frame or out-frame when the number of the white or black signals in each group equals or exceeds a set value, while determining out-frame or in-frame when the number of the white or black signals is less than the set value;
    e) discriminating one frame from a film position which is determined as in-frame to a film position which is successively determined as out-frame; and
    f) searching for the desired frame from a sequence of the discriminated frame.

2. The method according to claim 1, wherein in said step a), the film density is detected in plural positions in a width direction of the microfilm;
    in-frame or out-frame is determined in each of the plural positions in the width direction according to said steps b) to d); and
    in said step e), plural determination results in which in-frame or out-frame is determined are used to discriminate the presence of frames.

3. The method according to claim 2, wherein in said step a), the film density is detected on a straight line perpendicular to the running direction of the microfilm and in plural different positions in a width direction within a frame travel width.

4. The method according to claim 1, wherein said set value in said step d) is set in such a manner that the set value for determining the begining of the frame is different from the set value for determining the end of the frame.

5. A device for searching a desired frame from a microfilm by detecting the presence of frames from a density change in the running direction of the microfilm, comprising:
    a) an encoder for outputting a sampling signal for each predetermined feeding amount of the microfilm;
    b) a density sensor for successively detecting the film density of the microfilm along the running direction of the microfilm to output a series of density signals, the density sensor being provided within a frame travel width of the microfilm;
    c) a binarizing section for sampling a density signal from the density signals in synchronization with said sampling signal, and for binarizing the sampled density signal into a binarized signal which is white or black signal, the white signal representing a film transparent portion and the black signal representing a film non-transparent portion;
    d) a determination section for successively obtaining the number of white or black signals included in a group of a predetermined number of the binarized signals consecutive immediately before each sampling signal in response to the sampling signal, to determine in-frame or out-frame when the number of the white or black signals equals or exceeds a set value and to determine out-frame or in-frame when the number of white or black signals is less than the set value, and for descriminating one frame from a film position which is determined as in-frame to a film position which is successively determined as out-frame to output a determination signal indicative of the presence of the frame; and
    e) a searching section for searching for the desired frame based on said determination signal.

6. The device according to claim 5, wherein
    density sensors are arranged in plural different positions in a width direction of the microfilm;
    said binarizing section binarizes plural density signals outputted by each density sensor; and said determination section determines each position to be in-frame or out-frame using the group of binarized signals, and performs final determination with regard to the presence of frames based on plural determination results to output a determination signal.

7. The device according to claim 5, wherein said density sensor comprises: a pair of optical fibers having end faces opposed to each other with the microfilm placed therebetween; a light source for guiding light to one optical fiber; and a photosensor for detecting light incident upon the other optical fiber.

8. The device according to claim 5, further comprising:

a setting section for transmitting said set value to said determination section, the set value for determining the beginning of the frame being set smaller or larger than the set value for determining the end of the frame.

9. A microfilm search device for distinguishing presence of frames from a density change in a running direction of a microfilm and searching for a desired frame, comprising:

an encoder for outputting a sampling signal for each predetermined feeding amount of the microfilm;

a plurality of density sensors for detecting film densities on a straight line perpendicular to the running direction of the microfilm and in different positions in a width direction within a frame travel width;

a binarizing section for binarizing density signals outputted from the density sensors in synchronization with said sampling signal to output binarized signals;

a determination section for determining the presence of frames based on a plurality of binarized signals to output a determination signal; and a searching section for searching for the desired frame based on said determination signal.

10. The microfilm search device according to claim 9, wherein the density sensor comprises: a pair of optical fibers having end faces opposed to each other with the microfilm placed therebetween; a light source for guiding light to one optical fiber; and a photosensor for detecting light incident upon the other optical fiber.

* * * * *